Jan. 12, 1954 N. H. CASKIN 2,665,738
HEAT-SEALING APPARATUS FOR JOINING THERMOPLASTIC MEMBERS
Filed May 15, 1950 2 Sheets-Sheet 1

Inventor
Norman H. Caskin
By Robert W. Furlong
Atty

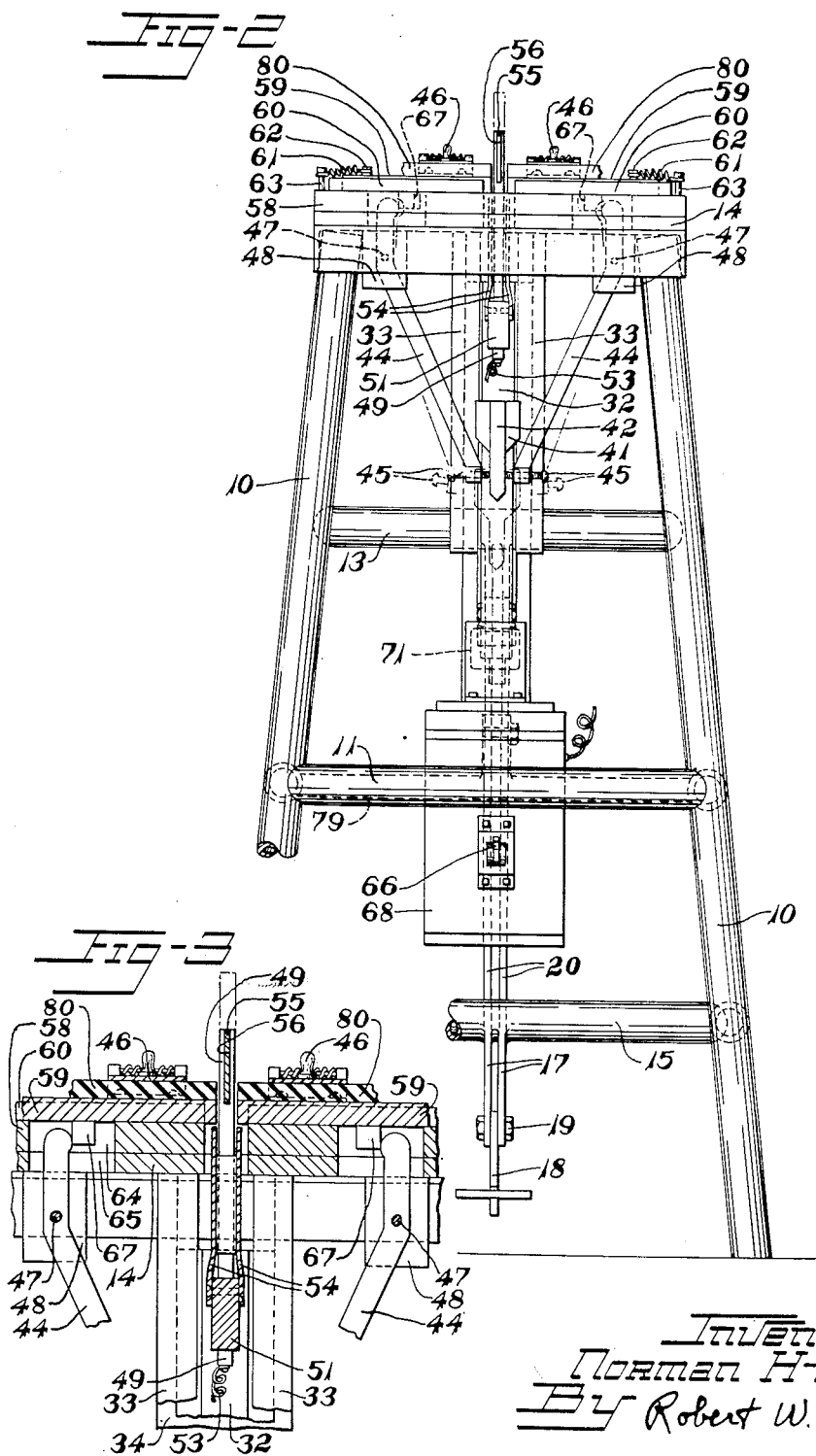

Patented Jan. 12, 1954

2,665,738

UNITED STATES PATENT OFFICE 2,665,738

HEAT-SEALING APPARATUS FOR JOINING THERMOPLASTIC MEMBERS

Norman H. Caskin, Marietta, Ohio, assignor to The B. F. Goodrich Company, New York, N. Y., a corporation of New York Application May 15, 1950, Serial No. 162,054

14 Claims. (Cl. 154—42)

This invention relates to apparatus for heat-sealing thermoplastic materials and pertains more specifically to apparatus for heat-sealing synthetic organic thermoplastic members by radiant heating of opposing surfaces of the thermoplastic members until such surfaces are softened and thereafter urging the softened surfaces to a contacting face-to-face relationship.

It is an object of this invention to provide an apparatus for heat-sealing thermoplastic members with bonds of improved strength and uniformity, which apparatus is rapid in operation and adapted to mass production operations.

It is a further object of this invention to provide an apparatus which forms an improved air- and water-tight juncture between thermoplastic members.

Another object of this invention is to provide an apparatus for heat-sealing thermoplastic members which does not burn or scorch the thermoplastic composition at the juncture between the members.

Still another object of this invention is to provide an apparatus for heat-sealing thermoplastic members which is capable of heating surfaces to be joined at any desired temperature within wide limits for any desired period of time.

A further object of this invention is to provide an economical and convenient means for heat-sealing thermoplastic members.

Other objects of this invention will be apparent from the description and drawings which follow.

Conventional methods heretofore employed in forming a juncture between thermoplastic members such as resins and organic plastics include softening the surfaces of the members to be joined by treating them with volatile solvent or by heating the surfaces by placing them either in contact with a stream of hot gas or in contact with a heating element similar to a soldering iron, then pressing the softened surfaces together and holding them in the desired position until the surfaces have again solidified either by evaporation of the solvent or by cooling.

Junctures formed by these conventional means have proven to be not completely satisfactory in that the solvent employed is expensive and its removal presents a fire hazard, the thermoplastic material adjacent the juncture is commonly scorched or burned resulting in a weak or defective bond, and the areas adjacent the juncture are commonly deformed or distorted from a desired contour because of excessive heating of the thermoplastic material. The temperature at which the surfaces to be joined are rendered plastic and the period of time during which the surfaces are heated are not readily controlled in apparatus of conventional construction nor may the temperature and/or period of heating be readily altered.

The present invention satisfies all of the objects set forth above and avoids the deficiencies inherent in the methods and apparatus heretofore known.

One embodiment of the apparatus of the present invention is shown in the appended drawings, which are intended merely as an illustration and not as a limitation upon the scope of the invention.

In the drawings:

Fig. 2 is a view in front elevation of the apparatus partly broken away showing the heating element in heating position and the thermoplastic members properly positioned on the apparatus; and Fig. 3 is an enlarged section on line 3—3 of Fig. 1.

Figure 1:
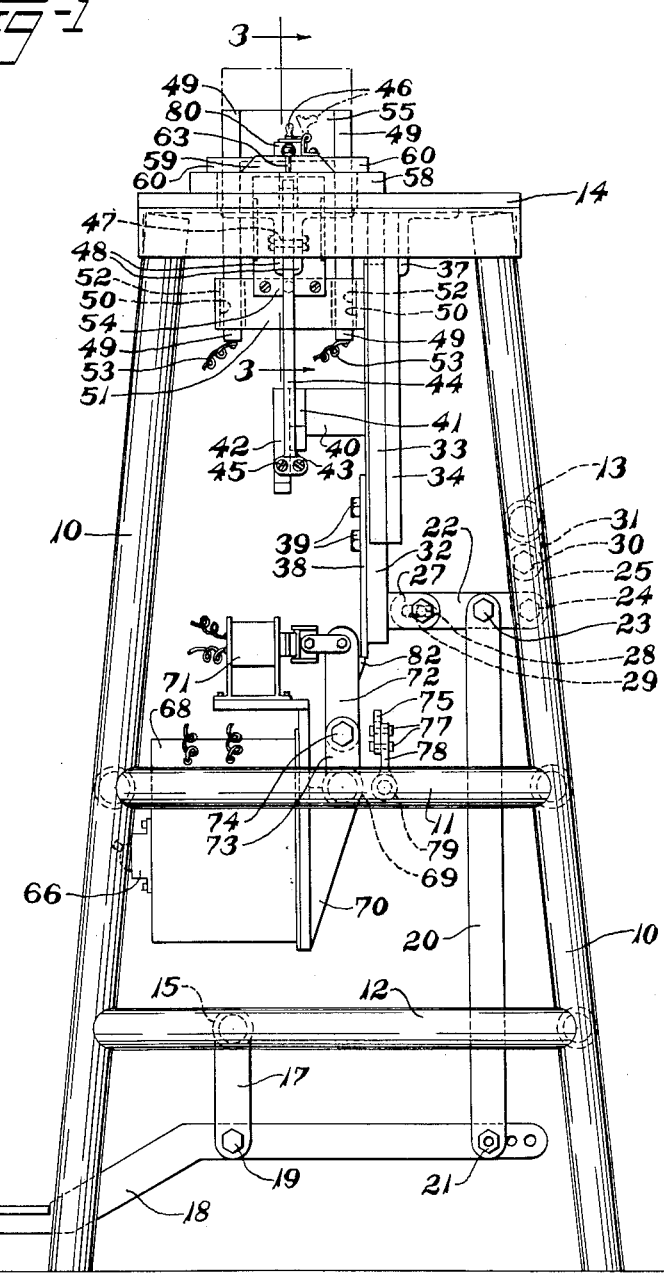
Fig. 1 is a view in side elevation of a heat-sealing apparatus constructed in accordance with this invention showing the heating element positioned for heating a pair of thermoplastic members to be joined.

The apparatus as shown in Fig. 1 comprises frames 10, 10 which are rigidly supported by braces 11, 11, 12, 12, and cross bar 13 and which form a foundation and support for base plate 14. Cross bar 15 is disposed between braces 12, 12 and is rigidly secured thereto. Brackets 17, 17 which are rigidly secured at one end to cross bar 15 provide support for foot treadle 18 which is pivotally mounted on brackets 17, 17 by pin 19.

Connecting arms 20, 20 are pivotally secured at one end to treadle 18 by pin 21 and at the other end to lever 22 by pin 23. One extremity of lever 22 is pivotally mounted by pin 24 on connecting arm 25 and the other extremity of lever 22 is mounted on brackets 27 by pin 28 which is free to slide in slot 29 in lever 22, forming a floating connection which permits a limited horizontal movement between lever 22 and brackets 27. Connecting arm 25 is pivotally mounted by pin 30 on brackets 31 which in turn are rigidly secured to cross bar 13 providing a linkage which also permits lever 22 to be moved laterally.

Brackets 27 are rigidly secured to slide 32 which is retained between guides 33, 33 and slide base 34 which is secured to base plate 14 by brackets 37. Stop 38 is adjustably secured to slide 32 by set screws 39, 39.

Spacer support 40 secured to slide 32 supports cam 41 and cam 42 which is secured in turn to cam 41. Adjustable cam followers 43, 43 housed in lever arms 44, 44 bear on the surfaces of cam 41 and adjustable cam followers 45, 45 also housed in lever arms 44, 44 bear on the surfaces of cam 42. Lever arms 44, 44 are pivotally mounted by pins 47, 47 on brackets 48, 48 which in turn are secured to base plate 14.

Rigid electrical conductors 49, 49, relatively long as compared to their girth, extend through conduits 50, 50 in spacer 51 which is secured to slide 32. Electrical insulating sleeves 52, 52 separate electrical conductors 49, 49 from spacer 51 and rigidly secure conductors 49, 49 within conduits 50, 50 forming an integral assembly with conductors 49, 49 and spacer 51. Leads 53, 53 secured to conductors 49, 49 provide a means for passing an electrical current through conductors 49, 49 and resistance heating element 55 which is fitted into slots 56 in conductors 49, 49. Any conventional method may be employed to regulate the quantity of electrical current passing through heating element 55, and hence the temperature to which the element is heated. Positioning stops 54, 54 which permit thermoplastic members to be properly positioned on the apparatus are secured to spacer 51. Brackets 27, slide 32, stop 38, spacer support 40, cams 41 and 42, spacer 51, electrical conductors 49, 49, positioning stops 54, 54 and radiant heating element 55 are all rigidly secured together forming an integral assembly which will hereafter be referred to as the heating assembly.

Guide base 58 is secured to the upper face of base plate 14. Slides 59, 59 which are permitted to move toward and away from each other are confined between guides 60, 60 which are secured to the upper faces of guide base 58. Clamps 46, 46 secured to slides 59, 59 provide means for maintaining thermoplastic members to be heat-sealed in a desired position during the heating and pressing operations.

Tension springs 61, 61 are disposed between posts 62, 62 on slides 59, 59 and posts 63, 63 on guide base 58 and constantly urge slides 59, 59 apart from each other.

Slots 64, 64 in guide base 58 and slots 65, 65 in base plate 14 permit lever arms 44, 44 to pivot about pins 47, 47 and engage lugs 67, 67 on slides 59, 59 to urge the slides toward each other.

A conventional electric timing device 68 which is actuated by toggle switch 66 is secured to cross bar 69 by means of brackets 70, 70. A solenoid 71 electrically connected with timing device 68 actuates trigger arm 72 which is pivotally mounted on brackets 73 by pin 74, and brackets 73 are in turn rigidly secured to cross bar 69.

An adjustable stop 75 is secured by set screws 77, 77 to bracket 78 which is rigidly secured to cross bar 79 providing positive means for terminating the vertical downward motion of stop 38.

To illustrate the operation of the heat-sealing apparatus thermoplastic members 80, 80 are placed on slides 59, 59. The operator depresses foot treadle 18 to its fullest extent pivoting treadle 18 about pin 19 forcing connecting arms 20, 20 upward which in turn forces lever 22 upward. Lever 22 is permitted to pivot about pin 23, pin 24 and pin 28 and is permitted to move laterally because of the floating connection of lever 22 to brackets 27 and due to the action of the linkage comprising connecting arm 25 and brackets 31. As lever 22 is moved upward brackets 27 which are rigidly secured to slide 32 are forced upward thereby causing slide 32 to move upward within the channel formed by guides 33, 33 and slide base 34. It is therefore obvious that as slide 32 is moved upward the entire heating assembly is moved upward. When the operator has depressed treadle 18 to its fullest extent the heating assembly has been moved upward until the upper marginal portions of positioning stops 54, 54 extend above the upper surfaces of slides 59, 59, as shown in dot-and-dash lines in Fig. 1. The operator positions the faces of members 80, 80 which are ultimately to be bonded together against positioning stops 54, 54 in contacting face-to-face relationship with said stops 54, 54 and in such a position on slides 59, 59 that the faces are directly opposing each other. When the heating assembly is in the position described above cam followers 43, 43 do not contact the cam surfaces of cam 41 and cam followers 45, 45 do not contact the cam surfaces of cam 42 thus permitting springs 61, 61 to maintain slides 59, 59 in a maximum spaced-apart position.

After properly positioning thermoplastic members 80, 80 the operator releases foot treadle 18 permitting the heating assembly to move downward until stop 38 rests on toe 82 of trigger arm 72, as shown in Fig. 1. Stop 38 is adjustably mounted on slide 32 by set screws 39, 39 and stop 38 is positioned so that the upper margins of positioning stops 54, 54 are below the upper surface of guide base 58 when the heating assembly is in the position as shown in Fig. 1. As the heating assembly moves downward, cam followers 45, 45 bear on the cam surfaces of cam 42 pivoting lever arms 44, 44 about pins 47, 47. As lever arms 44, 44 pivot about pins 47, 47 lever arms 44, 44 urge lugs 67, 67 on slides 59, 59 and consequently the opposing faces of members 80, 80 together. The distance which slides 59, 59 are permitted to move due to the action of cam followers 45, 45 on cam 42 positions the opposing faces of members 80, 80 to be bonded a proper distance from radiant heating element 55. Timing device 68 actuated by the manual operation of toggle switch 66 regulates the period of time during which the opposing surfaces of members 80, 80 are heated; the period of time for heating said surfaces being commenced at the time slides 59, 59 are moved to the proper heating position.

At the expiration of the heating period timing device 68 energizes solenoid 71 which urges trigger arm 72 to pivot about pin 74 and away from stop 38. Toe 82 on trigger arm 72 no longer restrains the downward motion of the heating assembly which is permitted to drop downward until the bottom face of slide 32 rests on stop 75. When the heating assembly is in this position, the upper edge of radiant heating element 55 is below the upper edge of guide base 58, permitting slides 59, 59 to be moved together. As the heating assembly moves downward cam followers 43, 43 bear on the cam surfaces of cam 41, as shown in dot-and-dash line in Fig. 2, causing lever arms 44, 44 to pivot about pins 47, 47 and to urge lugs 67, 67 on slides 59, 59 together and consequently cause thermoplastic members 80, 80 to be urged together until the opposing faces of members 80, 80 which have been softened by the heating step are in a contacting face-to-face relationship.

The molten surfaces of the thermoplastic members 80, 80 are maintained in a contacting relationship until the molten plastic cools forming a strong homogeneous bond between members 80, 80 and providing a unitary article consisting of members 80, 80.

It is preferable that the thermoplastic surfaces which are to be softened by the heat radiating from heating element 55 be positioned approximately $\frac{1}{32}''$ from the surface of the heating element. If a thermoplastic member is positioned too close to the heating element the thermoplastic material may be burned or scorched resulting in a weakened juncture. On the other hand, if the thermoplastic surface is positioned at a distance greater than approximately $\frac{1}{32}''$ from the surface of the heating element, the heat radiating from the heating element may be dissipated into the surrounding air and may be insufficient to soften the thermoplastic. It should be noted that the thermoplastic material does not contact heating element 55 but that it receives the necessary heat for rendering its surface plastic by the radiation of heat from heating element 55.

If it is desired, slides 59, 59 may be provided with channels adapted to receive and grip members 80, 80 in the desired position during the operating cycle of the apparatus.

It is preferable that the heating element be heated continuously during normal operation of the heat-sealing apparatus to minimize the period of time necessary to complete an operating cycle.

My apparatus is capable of joining any thermoplastic material provided, however, that the softening point of the thermoplastic members to be joined is lower than the softening point of the material from which the heating element is formed. It is particularly valuable for heat-sealing or bonding such thermoplastic materials as synthetic organic resins and plastics, as for example high molecular weight organic polymeric materials.

A heat-sealing apparatus in accordance with this invention provides a means for joining two thermoplastic members into an integral unit having a juncture which is air- and water-tight and which possesses a strength equal to the remainder of the article.

Apparatus within the purview of this invention provides a means of joining thermoplastic members which prevents burning or scorching of the thermoplastic material during the heating period, thereby providing a stronger juncture between the thermoplastic members. Heretofore, joining thermoplastic members by heating surfaces of the members until such surfaces became plastic resulted in burning or scorching the thermoplastic material. Burnt particles often were lodged between the bonded surfaces resulting in areas of the juncture which were very weak; as a result many of the bonded articles were necessarily scrapped. Furthermore, because of discoloration due to the burnt or scorched stock the articles were required to be formed from dark-colored opaque thermoplastic compositions. My apparatus by eliminating burnt or scorched stock permits the articles to be formed from light-colored clear thermoplastic compositions.

It is clear that obvious variations and modifications of this invention may be made without departing from the spirit and scope of this invention as defined in the appended claims.

I claim:

1. Apparatus for heat-sealing thermoplastic members which comprises a radiant heating element, means for supporting and maintaining said members in opposed spaced-apart relationship with said heating element interposed therebetween in spaced relation thereto until the opposing surfaces of said members have been softened, mechanical means for rapidly removing said heating element from between said members, and mechanical means for advancing said members together after removal of said heating element and for pressing the opposing softened surfaces of said members together in intimate face-to-face contact, the first said mechanical means including means for activating the second said mechanical means as said heating element is removed from between said members.

2. Apparatus for heat-sealing thermoplastic members comprising supporting means for maintaining said members in opposing spaced-apart relationship, a thin flat radiant heating element, means for moving said heating element into heating position between and spaced from said opposing members, the last said means including time-delay means for maintaining said heating element in heating position until the opposing faces of said members are softened and for rapidly removing said heating element from between said members, and means actuated by said moving means for pressing together the opposing softened faces of said members.

3. Apparatus for heat-sealing thermoplastic members which comprises supporting means for maintaining said members in opposing spaced-apart relationship, a thin flat radiant heating element, means for moving said heating element into heating position between and spaced from said opposing members, the last said means including time-delay means for maintaining said heating element in heating position until the opposing faces of said members are softened and for rapidly removing said heating element from between said members, and cam means actuated by said moving means for pressing together the opposing softened faces of said members.

4. Apparatus for heat-sealing thermoplastic members comprising a pair of opposed movable slide members for supporting and maintaining said thermoplastic members in opposing spaced-apart relationship, a thin flat radiant heating element, means for moving said heating element into heating position between and spaced from said opposing slide members, the last said means including time-delay means for maintaining said heating element in heating position until the opposing faces of said thermoplastic members are softened and for rapidly removing said heating element from between said thermoplastic members, and cam means actuated by said moving means for pressing together the opposing softened faces of said thermoplastic members.

5. Apparatus for heat-sealing thermoplastic members comprising a pair of opposed movable slide members for supporting and maintaining said thermoplastic members in opposing spaced-apart relationship, said slide members being confined in channels permitting said slide members to be moved together and apart, a thin flat radiant heating element, means for moving said heating element into heating position between and spaced from said opposing slide members, the last said means including time-delay means for maintaining said heating element in heating position until the opposing faces of said thermoplastic members are softened and for rapidly removing said heating element from between said thermoplastic members, and cam means actuated by said moving means for pressing together the opposing softened faces of said thermoplastic members.

6. Apparatus for heat-sealing thermoplastic members comprising a pair of opposed movable slide members for supporting and maintaining said thermoplastic members in opposing spaced-apart relationship, said slide members being confined in channels permitting said slide members to be moved together and apart, means for constantly urging said slide members apart, a thin flat radiant heating element, means for moving said heating element into heating position between and spaced from said opposing slide members, the last said means including time-delay means for maintaining said heating element in heating position until the opposing faces of said thermoplastic members are softened and for rapidly removing said heating element from between said thermoplastic members, and cam means actuated by said moving means for pressing together the opposing softened faces of said thermoplastic members.

7. Apparatus for heat-sealing thermoplastic members comprising a pair of opposed movable slide members for supporting and maintaining said thermoplastic members in opposing spaced-apart relationship, said slide members being confined in channels permitting said slide members to be moved together and apart, means for constantly urging said slide members apart, a thin flat radiant heating element disposed between a pair of electrical leads, means for moving said heating element into heating position between and spaced from said opposing slide members, the last said means including time-delay means for maintaining said heating element in heating position until the opposing faces of said thermoplastic members are softened and for rapidly removing said heating element from between said thermoplastic members, a pair of pivotally mounted lever arms adapted to contact and urge said slide members toward each other, and cam means actuated by said moving means for pivoting said lever arms and pressing together the opposing softened faces of said thermoplastic members.

8. Apparatus for heat-sealing thermoplastic members which comprises a radiant heating element, means for supporting and maintaining said members in an opposed spaced-apart relationship with said heating element interposed therebetween in spaced relation thereto until the opposing faces of said members have been softened, means for interposing said radiant heating element between said opposed spaced-apart members in spaced relation thereto, and means for rapidly separating said radiant heating element and said members when the said opposed faces of said members have been softened.

9. Apparatus for heat-sealing thermoplastic members which comprises a radiant heating element, means for maintaining said members in an opposed spaced-apart relationship with said heating element interposed therebetween in spaced relation thereto until the opposing faces of said members have been softened, mechanical means for rapidly separating said members and said heating element, and mechanical means for thereafter moving said members toward each other and for pressing said softened faces together in intimate face-to-face contact, the first said mechanical means including means for activating the second said mechanical means after said separation.

10. Apparatus for heat-sealing thermoplastic members which comprises a radiant heating element, a plurality of movable opposed slide members for supporting said thermoplastic members in an opposed relationship, means for maintaining said slide members in an opposed spaced-apart relationship with said heating element interposed therebetween and spaced from the opposed spaced-apart faces of said thermoplastic members until the opposing faces of said thermoplastic members have been softened, mechanical means for rapidly removing said heating element from between said thermoplastic members and said slide members, and mechanical means for thereafter pressing together said opposing softened faces of said thermoplastic members in intimate face-to-face contact, the first said mechanical means including means for activating the second said mechanical means as said heating element is removed from between said slide members.

11. Apparatus for heat-sealing thermoplastic members which comprises a radiant heating element, a plurality of movable opposed slide members for supporting said thermoplastic members in an opposed relationship, means for maintaining said slide members in an opposed spaced-apart relationship with said heating element interposed therebetween and spaced from the opposed spaced-apart faces of said thermoplastic members until the opposing faces have been softened, mechanical means for rapidly removing said heating element from between said thermoplastic members and said slide members, and means for moving said slide members toward each other immediately after removal of said heating element pressing together in intimate contact the opposing softened faces of said thermoplastic members, said mechanical means including cam means for activating said means for moving said slide members together.

12. Apparatus for heat-sealing thermoplastic members which comprises a radiant heating element, a plurality of supporting members movable to and from each other adapted to support said thermoplastic members and maintain them in an opposed spaced-apart relationship, positioning means movable to and from a position between said supporting members and said opposed thermoplastic members for positioning the opposed faces of said thermoplastic members a predetermined distance from said heating element, means for moving said positioning means to and from a position between said supporting members, means for interposing said heating element between said opposed thermoplastic members in spaced relationship therefrom, and means for rapidly removing said heating element from between said thermoplastic members.

13. The method of heat-sealing thermoplastic members which comprises positioning said members in an opposing spaced-apart relationship, interposing a radiant heating element between the said opposed spaced-apart faces of said thermoplastic members in spaced relationship therefrom, softening the said opposed spaced-apart faces of said thermoplastic members with radiated heat emitted from said radiant heating element, rapidly removing said heating element from between said thermoplastic members, advancing said thermoplastic members together pressing said softened faces into intimate contact.

14. The method of heat-sealing thermoplastic members which comprises providing slidable members for supporting said thermoplastic members, maintaining said slide members in opposed spaced-apart relationship, positioning said thermoplastic members in opposed spaced-apart relationship on said slidable supporting members, interposing a radiant heating element between the said opposed spaced-apart faces of said thermoplastic members and said spaced-apart supporting members in spaced relationship thereto, softening the said opposed spaced-apart faces of said thermoplastic members with radiated heat emitted from said radiant heating element, rapidly removing said heating element from between said thermoplastic members, advancing said supporting members toward each other to press the opposed softened faces of said thermoplastic members into intimate contact.

NORMAN H. CASKIN.

References Cited in the file of this patent

UNITED STATES PATENTS

| Number | Name | Date |
|---|---|---|
| 1,041,201 | Turner | Oct. 15, 1912 |
| 2,084,625 | Stebbins et al. | June 22, 1937 |
| 2,322,298 | Johnson | June 22, 1943 |
| 2,358,455 | Hallman | Sept. 19, 1944 |
| 2,360,950 | Kilgour | Oct. 24, 1944 |
| 2,367,670 | Christ | Jan. 23, 1945 |
| 2,402,631 | Hull | June 25, 1946 |
| 2,546,164 | Norris | Mar. 27, 1951 |
| 2,556,476 | Lamport | June 12, 1951 |
| 2,627,213 | Nye | Feb. 3, 1953 |